US009195821B2

(12) United States Patent
Kiperberg et al.

(10) Patent No.: US 9,195,821 B2
(45) Date of Patent: Nov. 24, 2015

(54) SYSTEM AND METHODS FOR REMOTE SOFTWARE AUTHENTICATION OF A COMPUTING DEVICE

(71) Applicant: TRULY PROTECT OY, Jyväskylä (FI)

(72) Inventors: Michael Kiperberg, Ashkelon (IL); Amit Resh, Even Yehuda (IL); Nezer Zaidenberg, Hod Hasharon (IL)

(73) Assignee: Truly Protect OY, Jyvaskyla (FI)

( * ) Notice: Subject to any disclaimer, the term of this patent is extended or adjusted under 35 U.S.C. 154(b) by 0 days.

(21) Appl. No.: 14/088,406

(22) Filed: Nov. 24, 2013

(65) Prior Publication Data

US 2015/0150084 A1    May 28, 2015

(51) Int. Cl.
*G06F 7/04* (2006.01)
*G06F 21/44* (2013.01)

(52) U.S. Cl.
CPC ..................................... *G06F 21/44* (2013.01)

(58) Field of Classification Search
CPC ....................................................... G06F 21/44
USPC ............................................................. 726/3
See application file for complete search history.

(56) References Cited

U.S. PATENT DOCUMENTS

| 7,877,596 | B2 * | 1/2011 | Foo Kune et al. | 713/153 |
| 8,112,485 | B1 * | 2/2012 | Cooley et al. | 709/206 |
| 2006/0041642 | A1 * | 2/2006 | Rosner et al. | 709/220 |
| 2007/0300070 | A1 * | 12/2007 | Shen-Orr et al. | 713/176 |
| 2013/0074150 | A1 * | 3/2013 | Soohoo | 726/3 |

* cited by examiner

*Primary Examiner* — Mohammad W Reza
(74) *Attorney, Agent, or Firm* — Yagod Morris & Associates

(57) ABSTRACT

The current disclosure relates to techniques for system and methods for software-based management of remote software authentication of at least one entity machine, addressing various vulnerabilities of software authentication based upon the genuinity based scheme. The disclosure is using challenge execution on at least one suspect machine, providing a technique for CPU event monitoring of a combined count of at least two events monitored on the entity machine during execution of the authentication challenge. The authentication challenge allows further detection functionality of virtual machine or a hypervisor installed. The techniques measures execution time of authentication challenge, comparing the received challenge result with the expected challenge result and accordingly rejects or allows the entity machine through the authentication process.

16 Claims, 8 Drawing Sheets

SYSTEM AND METHODS FOR REMOTE SOFTWARE AUTHENTICATION OF A COMPUTING DEVICE

FIELD OF THE INVENTION

The disclosure herein relates to system and methods for software-based authentication of a remote computing device. In particular, the disclosure relates to authentication challenge execution combined with CPU event monitoring, for virtual machine and hypervisor detection to determine authenticity, confidentiality and integrity of a remote computing device.

BACKGROUND OF THE INVENTION

The modern digital era and the rapid development of computer and internet technologies provide various cross-boundary opportunities, with an essential layer of computer networks to allow for digital communication. Such platforms require IT systems that guarantee authenticity, confidentiality, integrity, privacy, as well as availability. The need of reducing vulnerability and risk of unauthorized access to a network system is associated with various remote authentication services, as a more common approach to maintaining server security, mainly using hardware-based methods.

Software-based solutions and methods for remote authentication to establish trust between two entities, controlling access to computer or network resources, present a long-standing problem in computer security.

For example, digital content such as games, videos and the like, in a networked configuration may be susceptible to unlicensed usage and may be protected by a licensing verification program; such licensing programs may be circumvented by reverse engineering. Preventing the circumventing of a software licensing program may use a method of "obfuscation", making software instructions difficult for humans to understand by deliberately cluttering the code with useless, confusing pieces of additional software syntax, are still readable to the skilled hacker.

Additionally, encryption may be implemented for protecting digital content products, using a unique key to convert the software code to an unreadable format. Such protection may only be effective when the unique key is kept secured and unreachable to an unwanted party. Hardware-based methods for keeping the unique key secured are possible, but may have significant deficiencies, mainly due to an investment required in dedicated hardware on the user side, making it costly, and therefore, impractical. Furthermore, such hardware methods have been successfully attacked by hackers.

Thus, methods of software-based authentication of a remote machine, providing controlled and secured access is required in many aspects of computer related technologies. There is therefore a need for a better technique for software-based authentication solution. The present disclosure addresses this need.

SUMMARY OF THE INVENTION

Schemes for software authentication and virtual machine detection have been proposed as software-only solution. For example, a service provider, the authority, may establish a genuinity of a remote machine, the entity, by sending a challenge to be executed by the entity, containing checksum functionality. Accordingly, by passing the challenge test, the authority may safely provide services to entity machine. The genuinity test may embed hardware specific side effects into the checksum. The entity may compute a checksum over a trusted kernel, combining data values of the code with architecture-specific side effects of the computation itself. For example, values such as the Translation Look-aside Buffer (TLB) miss count, level-1 and level-2 cache hits and miss counts. Although such a model may reduce the risk of unauthorized access, it may be limited and vulnerable to various attacks.

The disclosure herein relates to system and software-based management of remote software authentication based upon challenge execution on at least one suspect machine, providing a technique for CPU event monitoring using performance hardware counters of a set of at least two events, combined with detection functionality of virtual machine or a hypervisor installed.

According to one aspect of the disclosure, a method is hereby taught for authenticating at least one entity machine being in communication with an authentication server, the method comprising: generating at least one authentication challenge; obtaining an expected challenge result comprising a calculated result combined with at least one hardware count value for the at least one authentication challenge; sending the authentication challenge to the at least one entity machine; starting a timer; receiving a challenge result from the entity machine; stopping the timer thereby recording an execution time for the entity machine; rejecting the entity machine if the execution time is longer than the execution time threshold value; comparing the received challenge result with the expected challenge result; and rejecting the entity machine if the received challenge result does not match the expected challenge result; wherein the at least one hardware count value comprises a combined count of at least two events monitored on the entity machine during execution of the authentication challenge.

The authentication method, wherein referenced a combined count of at least two events, further comprises the steps of: initializing a set of hardware components to a known state; assigning a hardware-counter to count a first event during execution of the at least one authentication challenge; monitoring the first event against an event condition; switching the hardware-counter to monitor at least a second event, when the hardware-counter meets the event condition. The combined count of at least two events further comprises the steps of updating the event condition to match the switched hardware-counter; and incorporating final hardware-counter readings into the challenge result.

Accordingly, the authentication method, further comprising: monitoring an $n^{th}$ event against an $n^{th}$ event condition; switching the hardware-counter to monitor at least an $(n+1)^{th}$ event, when the hardware-counter meets the $n^{th}$ event condition.

Further, the authentication method wherein referencing a combined count of at least two events, further comprises the step of updating said event condition to match switched said hardware-counter.

Optionally, it is noted that wherein referencing event condition is configured to be a threshold value associated with a specific event.

Optionally, it is noted that wherein referencing event condition is configured to be a pre-determined condition associated with a specific event.

Additionally, the authentication method wherein at least one of the events monitored on the entity machine is an event affected by the presence of a hypervisor such that if a hypervisor is present, the received challenge result will not match the expected challenge result and the entity machine is rejected.

Additionally, the authentication method wherein at least one of the events monitored on the entity machine comprises a machine specific register.

Additionally, the authentication method may further comprise the step of detecting hypervisor installed on the entity machine, and may comprise the steps of: initiating a checksum value; incorporating checksum of the authenticating software memory regions into the checksum value; incorporating checksum of a selected set of hardware counters into the checksum value; incorporating checksum of a set of machine specific registers into the checksum value, wherein the set of machine specific registers is derived from current checksum value; monitoring the set of machine specific registers and the selected set of hardware counters; and testing the presence of the hypervisor.

Accordingly, wherein referencing the step of testing presence of the hypervisor, further comprises the steps of: rejecting the entity machine if Extended Feature Enable Register (EFER) of the set of machine specific registers is having a flag set to a value of 1; and rejecting the entity machine if the set of hardware counters does not match the checksum as incorporated into the checksum value.

It is noted that the authentication method, wherein referencing expected challenge result may be generated by executing the authentication challenge on a machine identical to the entity machine.

According to another aspect of the disclosure, a method is hereby taught for detecting a virtual machine, the method comprising: setting a challenge function to be executed on a suspect machine within a time limit; obtaining an expected challenge result; transmitting the challenge function to the suspect machine; measuring an execution time of the challenge function; receiving a challenge result from the suspect machine; and comparing received challenge result with the expected challenge result; accepting the suspect machine if the challenge result matches the expected challenge result and the execution time is less than the time limit. Accordingly, wherein the challenge function is monitoring at least two hardware counting events whereby the execution time is less than the time limit.

As appropriate, the method of detecting a virtual machine, wherein referencing a challenge function, comprising the steps of: initializing a set of hardware components to a known state; using a hardware-counter to count a first event during execution of the challenge function; monitoring the hardware counter against an event condition; switching the hardware-counter to monitor at least a second event, when the hardware-counter meets the event condition; updating the event condition to match the switched hardware-counter; and incorporating final hardware-counter readings into the challenge result.

Optionally, the method of detecting a virtual machine, wherein referencing event condition is configured to be a threshold value associated with a specific event.

Optionally, the method of detecting a virtual machine, wherein referencing event condition is configured to be a pre-determined condition associated with a specific event.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION OF THE INVENTION

Figure 1:
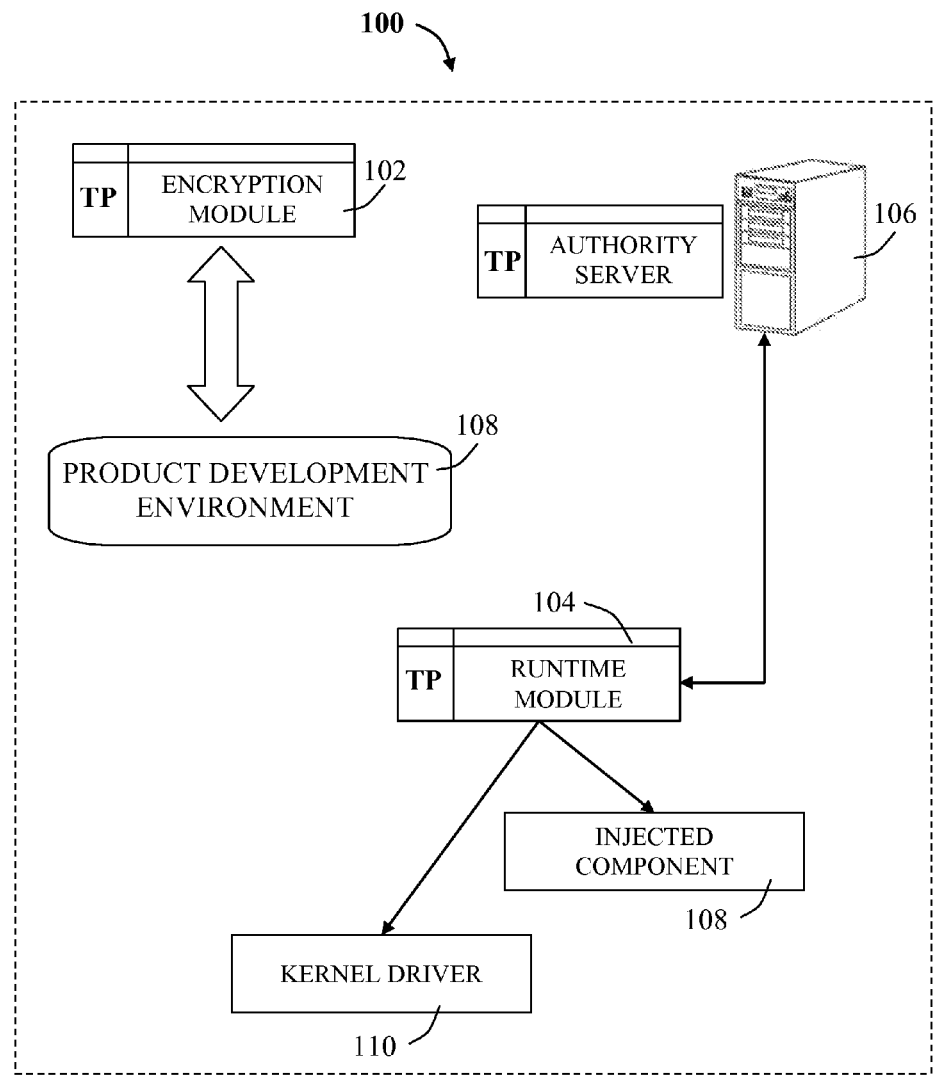
FIG. 1 is a schematic block diagram of the main module components representing the system architecture for software copy-protection used for secure software distribution.

Authentication has become more pervasive and important in the technology space addressing a variety of areas such as banking, online commerce, cloud computing, licensing, software as a service (SaaS) and the like. The challenges of implementing and maintaining secure authentication has grown extensively, especially as attackers are getting more sophisticated, trying to attack corporations and private persons to steal critical business and personal information.

Additionally, hardware solutions are still dominating the market as organizations consider the physical layer protection to provide higher security. Yet, the tendency is changing and software-based authentication solutions become more attractive because of lower costs, convenience, disaster recover ability and easy scalability.

Aspects of the present disclosure relate to a technique for software-based authentication of a remote computing device based on challenge execution. The current disclosure offers a different approach to software authentication coupled with virtual machine and hypervisor detection to guarantee authenticity, confidentiality and integrity of the remote computing device. In particular, the disclosure provides a software authentication technique of at least one entity machine being in communication with an authentication server, comprising a challenge result analysis, where challenge is executed on suspect entity machine. The executed authentication challenge is based on check-summing specific memory regions combined with hardware counting of at least two events monitored on the suspect entity machine during execution of the authentication challenge.

Additional aspects of current disclosure relate to virtual machine (VM) analysis and hypervisor detection. Security of virtual machines and virtualized infrastructures are vulnerable to hacker attacks. For example, a hacker may take over a VM and thereafter use the VM to attack other VMs; on the same host machine or on other networked machines. Additionally or alternatively, the presence of a hypervisor layer may introduce a further severe security impact. The current disclosure answers the need for detecting virtual machines and installed hypervisors.

Embodiments described herein, disclose a remote software-based authentication system and methods based on of challenge execution combined with hardware counting of at least two events monitored on a suspect machine, with added consideration of side effects functionality and VM and hypervisor detection, operable to be incorporated into the genuinity based scheme.

Side Effects:

In computer science, every executed function has some side-effect, resulting from using memory, taking CPU time and the like. A function or expression is said to have a side-effect if, in addition to returning a value, it also modifies some state or has an observable interaction with calling functions of the outside world. For example, the modern Pentium processors have a large quantity of performance events that may be used as side-effects. However, there are a limited number of hardware counters to count those events. In high-end processors there are 8 counters while in the lower-end only 2 counters.

The term side-effects may refer to any parallel process which are time consuming to emulate and may further modify the inner state of the CPU, such as storing data, bringing data to the cache, evicting data from the cache or the like. It is further noted that some modifications of the state of the CPU may increment the corresponding hardware counter.

It is particularly noted that even though, there may be limited number of hardware counters, efficient utilization may contribute to perform the checksum functionality based upon a much larger unlimited hardware available side-effects, providing secured process of software authentication.

The process may initialize a large amount of hardware components to a known state (state zero), setting up a hardware counter to count one single event, monitoring the hardware counter against a condition upon which the counter is switched to monitoring a different event, while the latter step of switching and monitoring is repeated.

For example, the following flow of events: flushing the data cache; flushing the Data Translation Look-aside Buffer (DTLB) cache; setting a hardware counter to count Translation Look-aside Buffer (TLB) misses while check-summing the kernel space. When hardware counter reaches some threshold or fulfills a predefined condition, switching the hardware counter to count data-cache misses and continue check-summing.

It is noted that the step of monitoring and switching may further continue according to a preset configuration of the challenge.

The repeated monitoring state brings the CPU to a different state with regard to the initial state prior to the execution of the challenge. Thus, counting of cache misses from that point on is effected by that state. Additionally, the point where counters were switched to monitor a different event may be governed by a function side-effect.

Therefore, a virtual machine executing the challenge may need to simulate both, the DTLB and the data cache throughout the entire sequence. While the genuinity based scheme machine performs such monitoring with a single hardware counter which may be used to "cover" many performance events. Additionally or alternatively, the use of two hardware counters may introduce further complications to a virtual-machine implementation by allowing the hardware counter switch event to be a function of both hardware counters aligning on a certain rule. For example, (Counter-1>Threshold && counter-2 divisible by 7), may achieve a true random sequence of hardware counter switching.

Virtual Machine Detection:

A virtual machine (VM) is a software implementation of a computing environment in which an operating system (OS) or program may be installed and run. A VM typically emulates a physical computing environment, but requests for CPU, memory, hard disk, network and other hardware resources are managed by a virtualization layer which translates these requests to the underlying physical hardware. The virtualization layer, such as a hypervisor (as described hereinafter) or a virtualization platform runs on top of a client or server operating system. This operating system is known as the host OS. The virtualization layer may be used to create many individual, isolated VM environments running on the same physical hardware.

It is noted that the target computer system may be validated to be a real machine, not a virtual machine (VM) such as emulators, simulators, or having any hypervisors installed. The architecture of the systems and methods described herein may provide the necessary tools for such validity check.

Hypervisor Detection:

A hypervisor is a software program, executed by the CPU, running as privileged code with privileges greater than those granted to the operating system (OS). The hypervisor may allow multiple operating systems, referred to as guest operating system, to share a single hardware host, acting as a virtual machine manager. Each such operating system appears to have the host's processor, memory, and other resources all to itself. However, the hypervisor is actually controlling the host processor and resources while allocating what is needed to each operating system in turn, making sure that the guest operating systems (also called virtual machines) cannot disrupt each other.

The hypervisor may be able to intercept accesses to important resources inside the CPU, and may disallow access to the resource or make the resource look differently from what it actually appears to.

It is noted that hypervisors introduce a new layer of privileged software code that may present a target for hacker attacks. A hacker compromises the hypervisor, may control all data traversing with full abilities to view, redirect, or spoof anything. Guest operating systems may have no way of knowing they are running on a compromised platform. This "hyper jacking" scenario may represent a severe risk in large virtualization platforms that offer 10, 50, or even hundreds of hosted servers running on a single hardware unit.

It is particularly noted that virtualized environments may create a one-to-many attack scenario when the host machine is attacked, and the attacker gets root or administrator privileges over the hardware.

It is further noted that, the hypervisor may act as the man-in-the-middle in the man-in-the-middle attack, where in such attack a malicious actor may insert him/herself into a conversation between two parties, impersonating both parties to gains access to information that the two parties were trying to send to each other.

Therefore, there is a need to assure that this kind of attack cannot be performed, and additionally, guarantee that any new hypervisor to be installed is authentic.

System's Architecture:

It is noted that the system software architecture provides the development and runtime environments for executing checks of the protected data-blocks successfully, avoiding bypassing or circumventing by any unwanted party.

The distributed system's architecture, as described hereinafter with reference to FIG. 1, comprises of three main module components: an encryption module component 102, a runtime module component 104 and an authority server component 106. The encryption module 102 may allow for integration with the customer's development environment to produce encrypted source code instead of standard executable machine code. The runtime module 104 is structured in two parts, where the first sub-component 108 may be injected into the product encrypted executable and the second sub-component 110 may act as the kernel driver on the target computer system, operable in kernel mode (privilege ring 0). The authority server 106 is configured to provide the necessary decryption key for the software to operate correctly.

Optionally, encrypting the whole source code is possible, but generally does not contribute effectively and may further, incur a degree of performance degradation. In practice, encrypting only a set of critical executable functions to allow for the license check and software to function properly, may be sufficient.

According to embodiments of the current disclosure, this section of protected code may only be stored in its decrypted state within the cache of the CPU.

Additionally, when encrypting a product source code, the encryption module component may inject elements of the runtime code and data-structures into the created executable. Accordingly, the resulting executable may be operable to load, run and automatically kick-start the runtime module component and execute successfully, if the correct decryption key is available from the authority server. Since the encryption may use modern cryptography, such as using Advanced Encryption Standard (AES) or the like, reverse engineering of the critical encrypted functions may not be possible, as the industry considers AES or the like to be practically unbreakable.

As appropriate, once associated software is executed, the runtime module component established secured communication channel with the authority server to obtain the associated decryption key for software operability, as described hereinafter in FIGS. 1 and 2. Accordingly, for providing the necessary decryption key, the authority server may validate the request is arriving from a "real" target computer system and not from a virtual machine. As appropriate, any requests from a virtual machine, emulator, simulator or any possibly running hypervisor, may be rejected.

Where appropriate, the authority server may further validate that the target computer system is equipped with operating system (OS) running a known OS kernel.

Additionally or alternatively, the authority server may validate that the target computer is clean of potentially malicious drivers.

Additionally or alternatively, the authority server may validate that the target computer system is representing an authorized/licensed user, namely, a paying customer.

It may be noted that the kernel driver may be initially installed on a target computer system, using conventional driver installation methods.

It may further be noted that the kernel driver may be freely distributed, in various forms such as part of a protected software installation process or the like.

Systems and methods of the disclosure are not limited to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described hereinafter may be used in the practice or testing of embodiments of the disclosure. Nevertheless, particular methods and materials are described herein for illustrative purposes only. The materials, methods, and examples are not intended to be necessarily limiting.

System's Embodiments:

Reference is made to the system block diagram of FIG. 1 showing schematic distributed system architecture representation 100 of the main module components.

The distributed system's architecture 100 may provide the platform for various secured software functionalities such as software integration, encrypted packaging, software triggering and flow management, providing secured communication channel to allow run-time authentication, obtaining/storing/hiding of decryption keys, validation and product integrity checking and the like.

The distributed system's architecture 100 includes an encryption module component 102 operable to integrate with the product development environment, a runtime module component 104 and an authority server component 106, configured to manage secured communication channel with a client computer system providing decryption key, to allow secured functioning and operability of the encrypted code sections. The runtime module component 104 further includes two sub-components: an injected code sub-component 108 and a kernel driver sub-component 110.

Figure 2:
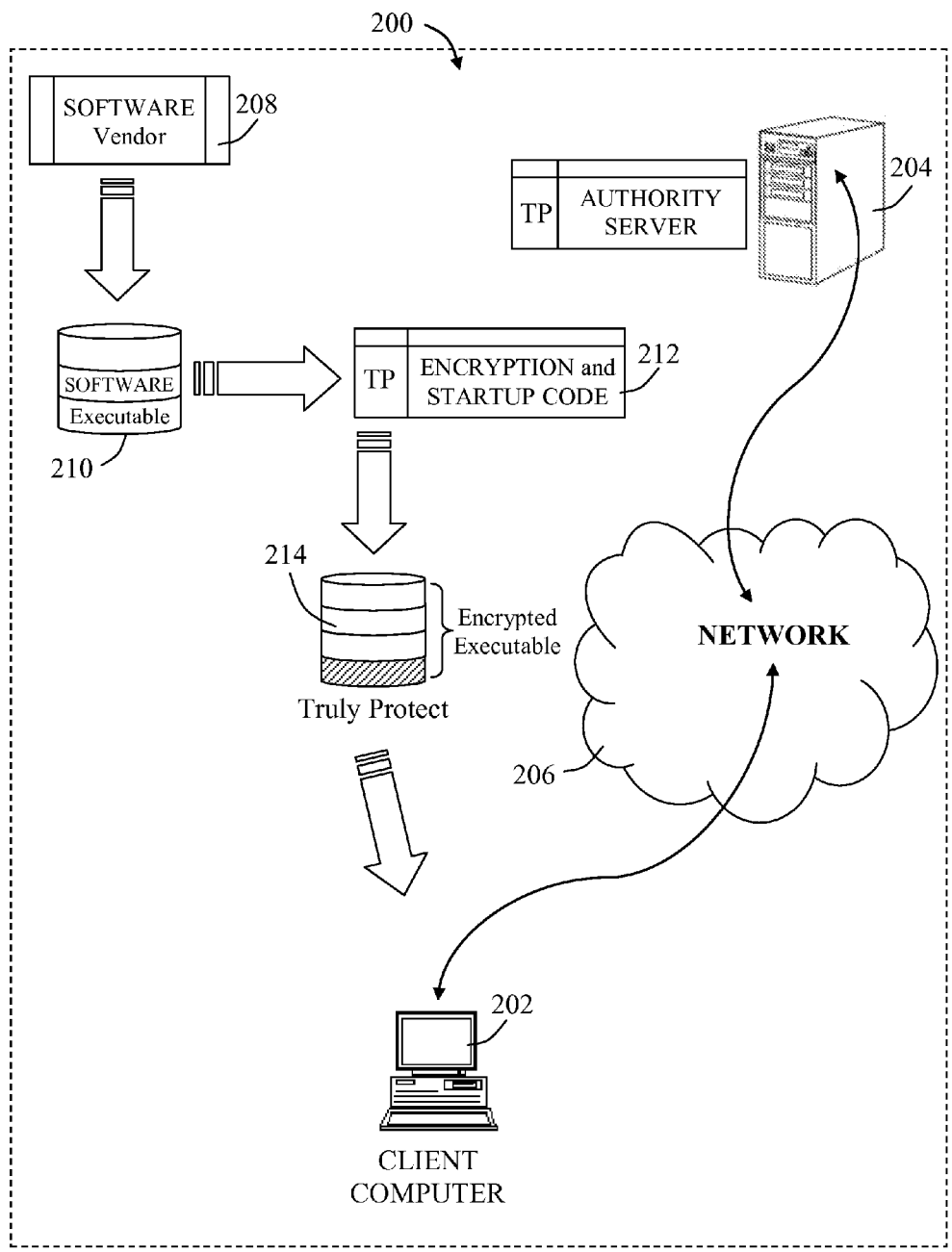
FIG. 2 is a schematic block diagram of the main components of a distributed computing system supporting software copy-protection used for secure software distribution.

The encryption module 102 may inject the runtime sub-component 108 including runtime code elements and data-structures into the software executable 212 (FIG. 2). The resulting encrypted software executable 216 (FIG. 2) may be operable to load, run and automatically kick-start the runtime module. The second sub-component 108 of the runtime module may be operable as a kernel driver, functioning in the kernel space and may be operable to establish a secured communication channel with the authority server, to manage handling of the decryption keys, for example.

Optionally, the decryption key may be obtained upon every request to decrypt an encrypted code segment.

Alternatively, or additionally, the decryption key may be obtained and stored in a CPU register for further usage. Accordingly, upon the next request for the decryption key, may verify the availability of the key in the CPU register and only if not present, a further request may be issued to the authority server 106. Optionally, the number of uses of a stored decryption key may be limited such that the decryption key is deleted from the registry when the number of usages exceeds a maximum threshold number. Once the maximum threshold is reached, the decryption key may be automatically deleted and upon the next request a new decryption key may be obtained from the authority server, possibly following a verification procedure.

Reference is now made to the system block diagram of FIG. 2 showing schematic representation of the main components of a distributed computing system 200, based on disclosure's module components, supporting software copy-protection used for secure software distribution. According to various embodiments, such a software distribution system may for example be used for distributing media such as gaming software, audio software, video software, application software and the like.

The distributed computing system 200 may be used to facilitate the authentication of a client computer system to provide protected license checking while supporting functionality of hiding the decryption keys and secured operability of a third party software products' vendor.

The distributed computing system 200 includes a client computer 202, in communication with an authority server 204 through communication network 206. The software vendor 208 produces a software product comprising a set of executable computer instructions 210 coupled with injected encrypted startup code 212 to form an encrypted executable product 214.

The distributed computing system 200 may provide an integrated environment for a third party software product vendor to allow encapsulating a software product with encrypted functionality to avoid hacking and miss-use of the software product. The distributed computing system 200 may provide various functionalities such as software integration, encrypted packaging and run-time protection.

The software product vendor 208 may integrate its development environment with the encryption and runtime modules to allow the product source code to produce encrypted instead of standard executable machine code. Additionally, the encryption module may be used to inject into its vendor's product executable 210 the required runtime code and data-structures such as start-up code and the like 212 to provide an encapsulated encrypted product 214 operable to run on a client computer system 202 with the desired protected functionality of the vendor's product.

Accordingly, when the vendor's product 214 is activated on the client computer, the injected code interacts internally with the pre-installed kernel driver, in a kernel-mode context and communicating with the remote authority server to obtain the necessary decryption key, allowing for proper functionality of the vendor's software product. Where required, the injected code may be configured to install the kernel driver, if kernel driver is not pre-installed.

It is noted that the system may be used for protection of gaming software such as war games, sports, gambling and all other games. Included are games played by a single person, games played synchronously by multiple players, and games played non-synchronously by multiple players. In this context, "played synchronously" means either that multiple players are acting at the same time, or players respond to each other essentially in real-time.

It is further noted that the distributed computing system 200 may support various software and gaming products operable on various computer operating systems (OS), and may further include support for communication devices such as mobile communication devices, handheld devices, tablet computers and the like.

Accordingly, the distributed computing system 200 may be operable to share various software applications. Such software applications may include, for example, gaming, use of graphics, picture, video, text, music files supporting various file formats, multimedia files, combinations thereof or any other data type files, including data collection files and the like.

Figure 3:
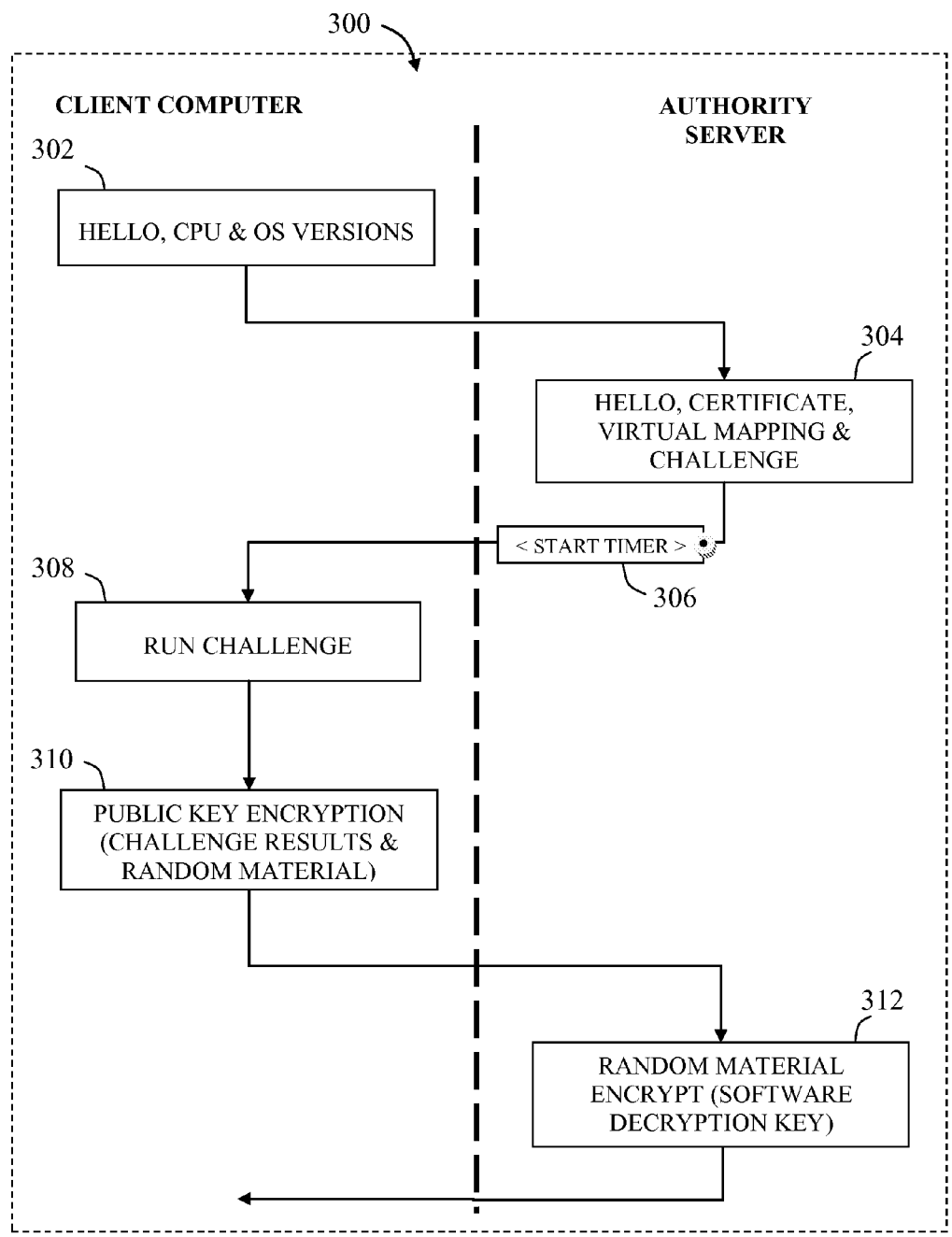
FIG. 3 is a flowchart representing selected actions of a method for performing key exchange communication between a client system computer and an authority server.

Reference is now made to the flowchart of FIG. 3 representing selected actions of a method for performing key exchange communication between a client computer system and an authority server in a distributed computer system 300.

Executing a protected software function requires a decryption key for the software on the client computer system side for decrypting the encrypted section, making the protected software operable. Such decryption key may be obtained from an authority server. Thus, when the software code is executed, the runtime module residing on the client computer system may be triggered to establish a secured communication channel with the authority server, over Public Key Infrastructure (PKI). The authority server may provide the requested decryption key, based upon a successful validation process. The validation process may comprise checking various parameters applicable to the target client computer, such as: target client computer is a "real machine", not a virtual machine, emulation or the like; target client computer is running a known OS kernel; target client computer is clean of potentially malicious drivers; the user is an authorized/licensed customer and a combination thereto.

The secured communication channel over PKI between the client computer system and the authority server guarantees the privacy of the information exchanged between the two entities. The client computer system may communicate ID information of the client target computer, identifying the owner, providing additional target computer environment parameters and kernel OS version currently running. The authority server may respond by sending a challenge function to be executed by the kernel mode driver portion of the client target computer. The challenge function may involve check-summing of critical portions of the client target computer's memory regions and may be combined with hardware counting of at least two events monitored on the client. Further, the challenge may monitor several hardware side-effects functionality and VM and hypervisor detection.

Where appropriate, the challenge response may be configured to timeout by the authority server, such that a correct result within a predetermined period constitutes an initial proof of the validation process, namely being a real machine running a known OS kernel. It may further verify that the correct version of the runtime module is executing on the client target computer. The challenge code may be generated by the authority server and may contain a pseudo-random component, making every challenge different, avoiding any replay-attacks. The runtime module, as a trusted computer, may further verify that client target computer is clean of potentially malicious drivers, by scanning the target machine and incorporating the scanning result into the reply to the server.

Accordingly, by passing the challenge test, the authority may safely provide services to the entity machine.

The method for performing key exchange communication between a client computer system and an authority server in a distributed computer system 300 may include sending an initiation message of introduction by the client computer system containing CPU and operating system (OS) parameters for identification—step 302; The authority server may respond to client's introduction with a message containing its certificate, virtual mapping parameters and a challenge function—step 304; which may be run on the client computer system—step 308 after a timer is activated—step 306 enabling to measure the execution time of the challenge; the public key encryption may be encapsulated with the results of the challenge function with additional material transmitted to the authority server side—step 310; and the encrypted random material received on the authority server side, and decrypted—step 312 as part of the identification process;

It is noted that the client computer system may check the authority server certificate's validity period, for example. If the current date and time are outside of a range, the licensing process may not go any further.

Figure 4A:
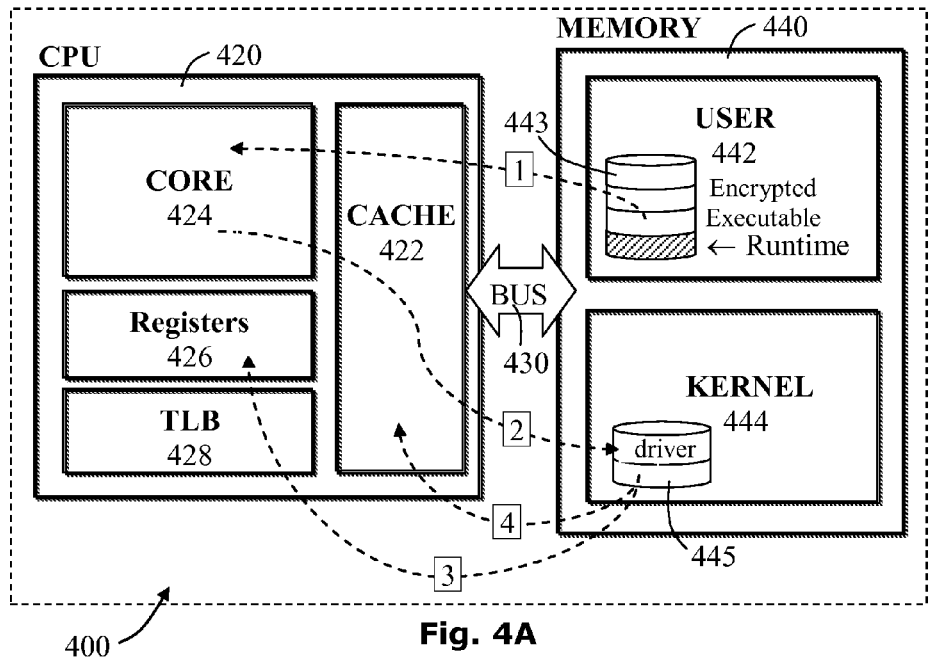
FIG. 4A is a schematic block diagram representing the main components of a client system CPU configured with a kernel driver combined showing a possible execution flow of protected code instructions.

Reference is now made to the schematic block diagram of FIG. 4A representing the main components of a client system's CPU 400 configured with kernel driver, operable to execute encrypted data-blocks combined with superimposed execution flow steps.

It is noted that the term "client system" refers to any kind of consumer data unit having a memory region and a region for processing digital information such as a software program, blocks of data, or any other digitally stored information including but not limited to applications such as video, audio, or gaming programs, and including gaming programs played synchronously and non-synchronously among two or more participants.

It is further noted that the superimposed directional arrowed lines, indicating the encrypted code execution flow, marked 1 through 4 is further expanded and described hereinafter in FIG. 4B, in a form of a flowchart.

The processor architecture may allow the CPU to operate in two modes: kernel mode and user mode and where appropriate, hardware instructions allow switching from one mode to the other. Accordingly, when the CPU is running in user mode, the CPU may access memory in user space only, and any CPU attempts to access memory in kernel space, results in a "hardware exception". The kernel space is strictly reserved for running the kernel, kernel extensions, and most device drivers. Thus, installing the kernel driver in the kernel space provides the kernel driver with higher priority in managing the protected data-blocks and may have full access to all memory and machine hardware.

The client CPU system 400 includes main components of a CPU 420 and a main memory 440 connectable through a system bus 430. The CPU 420 may further include a Cache component 422, a CPU Core component 424, CPU set of registers 426 and CPU TLB (Translation Look-aside Buffer) 428. The main memory 440 may further include the user space 442 and the kernel space 444, which may optionally be independent and implemented in separate address spaces. The user space 442 may contain the encrypted executable code including the runtime module section 443, while the kernel space 444 may be hosting the installation of the kernel driver 445.

The CPU Core component 424 may be configured as the processing unit which reads in instructions to perform specific actions, while CPU TLB 428 is used to map virtual addresses to physical addresses, commonly in a form of a table in the processor memory, enabling faster computing by allowing the address processing to take place independently from the normal address-translation pipeline.

The execution flow may start with the loading of the next encrypted segment 443 to be executed from the user space 442 to the CPU Core 424—step 1; the CPU delegates the encrypted segment to the kernel driver 445 in the kernel space 444—step 2; the kernel driver then, shuts down pre-emption and all interrupts, while interacting with CPU registers 426—step 3; retrieves the decryption key from one of the CPU registers; and with the retrieved decryption key, optionally may be retrieved from the authority server (not shown) if not already stored in one of the CPU registers 426, decrypts the encrypted segment, placing it into the CPU Cache 422—step 4; allowing the instructions of the decrypted segment to run in the kernel driver context. Subsequently, the CPU Cache 422 is discarded and the kernel may restore pre-emption and interrupts.

Figure 4B:
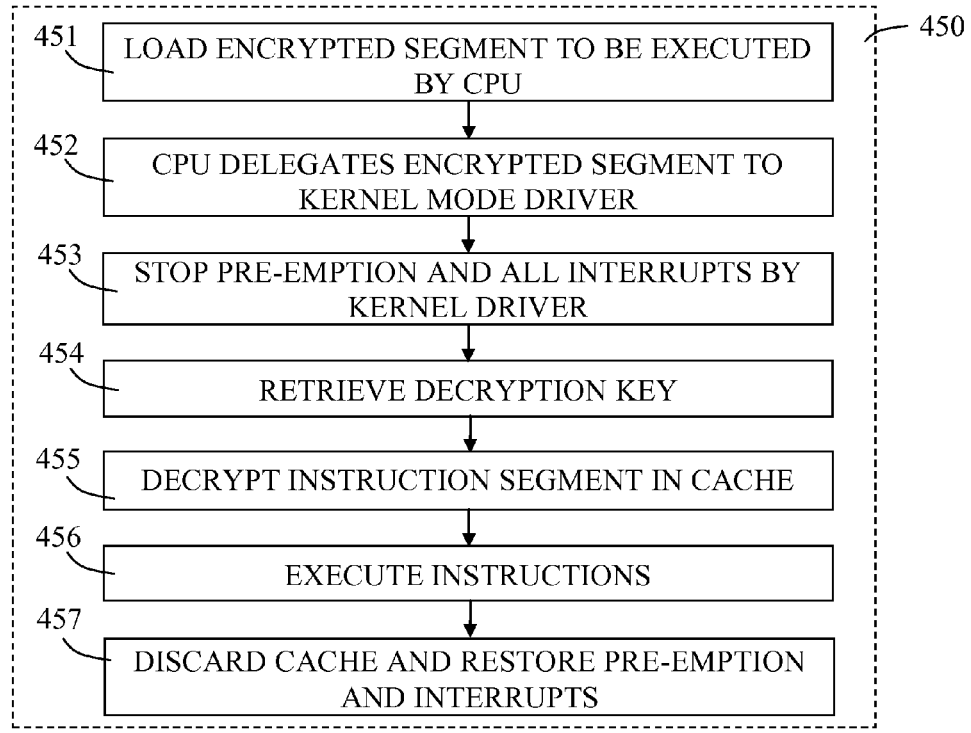
FIG. 4B is a flowchart representing selected actions of a method for executing encrypted code instructions in a processor's CPU.

Reference is now made to the flowchart of FIG. 4B representing selected actions of a method 450 for executing encrypted code instructions in the client system's CPU.

It is noted that the method 450 may be operable on a client system's CPU 400 configured with kernel driver as described hereinabove in FIG. 4A. The method may be used to change the state of a segment of instructions from an un-executable or encrypted state to an executable or unencrypted state.

The encrypted instruction code segment may be executed on the target computer by runtime module upon completion of the decryption process. As appropriate, after the authority server positively validates the target computer, as described hereinabove, the authority server may transfer the appropriate decryption key over a PM-secure communication channel. The distributed computer system may be configured to store the decryption key in privileged (protected) registers and may also be configured to monitor and prevent accessing these registers for the duration of the software execution. The distributed computer system then disconnects the communication link to the authority server and execution of the protected software may commence.

When the CPU reaches an encrypted section in an un-executable state but that it needs to execute, the runtime module is invoked, using the obtained decryption key to perform the decryption of the machine instructions and to render the instructions executable.

It is particularly noted that the instructions in the CPU cache, while in an executable state, the unencrypted instructions are not stored to memory. The CPU may execute the decrypted instruction directly from cache, under the context of the kernel-mode driver, under no-preemption and all-interrupts-disabled mode. It may subsequently discard the cache contents just before normal control is returned to the system software.

The decryption key and decrypted machine-code segments may be locked in the CPU and may never be placed on the CPU BUS or stored to external memory. Therefore, malicious users may only have access to the code whose critical segments are encrypted. This property of the current disclosure may prevent the making of copies for unauthorized distribution or bypassing critical code sections such as license check.

Referring to FIG. 4B, the method for executing encrypted code instructions in the client system CPU 450 may include the steps of: loading the encrypted code segment into the CPU Core (424, FIG. 4A) from the user space (442, FIG. 4A) to be executed by the CPU—step 451; the CPU may then delegate the encrypted code segment to the kernel driver (445, FIG. 4A), residing in the kernel space (444, FIG. 4A)—step 452; at this stage, the kernel driver may perform two subsequent steps: the first one is shutting down pre-emption and all interrupts—step 453 and retrieving the decryption key—step 454 from the authority server (not shown); using the decryption key to decrypt the encrypted code instructions, placing the decrypted instruction segment into the memory cache (422, FIG. 4A)—step 455; executing the decrypted instruction segment under the kernel driver context—456; and upon completion of code segment execution, discarding the memory cache and restoring pre-emption and interrupts—step 457.

Optionally, the decryption key may be obtained from the authority server (206, FIG. 2) and thereafter stored in a CPU register (426, FIG. 4A) for further usage. The next request for a decryption key, may verify the availability of the decryption key in the CPU register (426, FIG. 4A) and only if not available, a further request may be issued to the authority server.

Optionally again, the decryption key may be obtained from the authority server (206, FIG. 2) upon every request for decrypting an encrypted code segment.

Figure 5A:
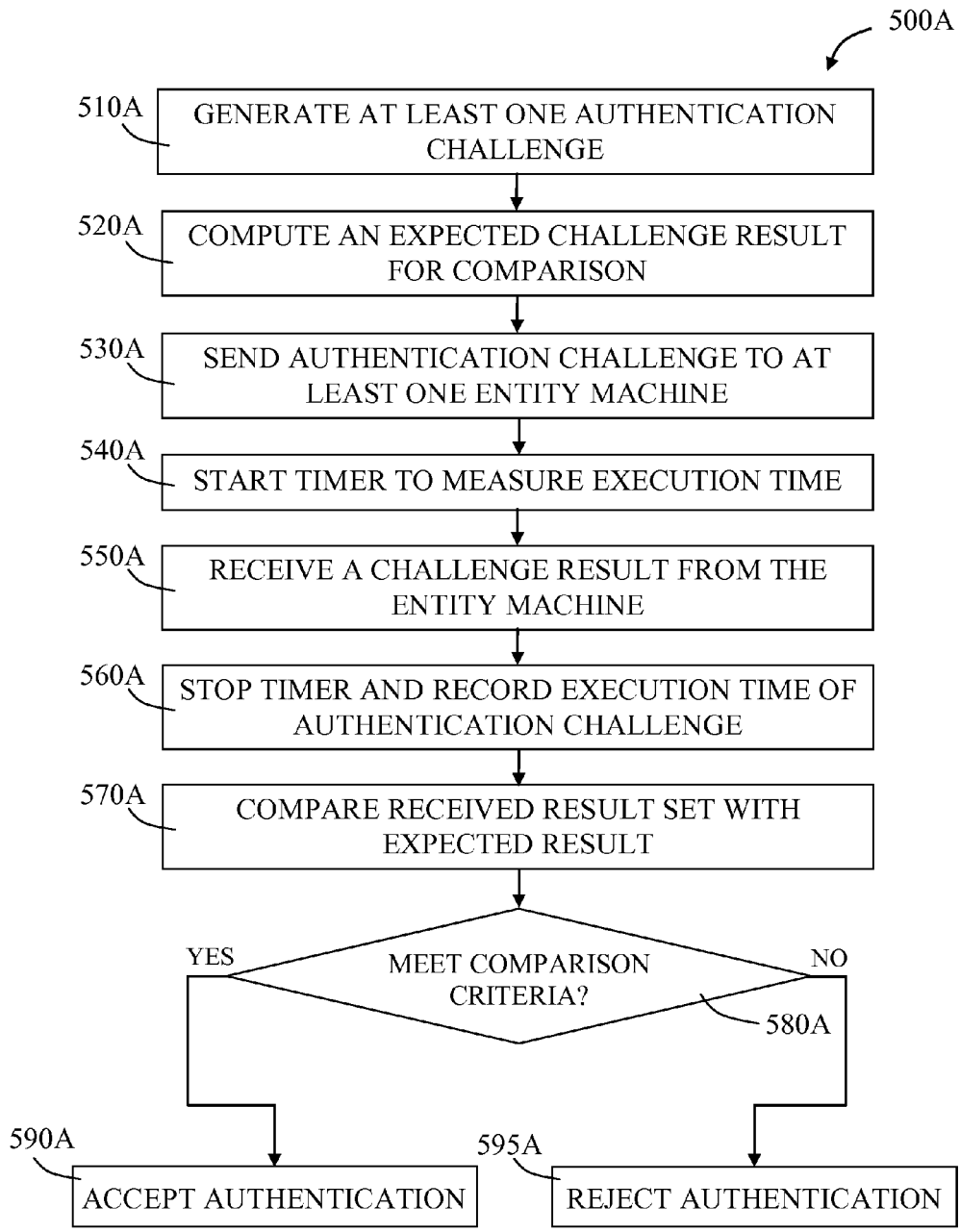
FIG. 5A is a flowchart representing selected actions of a method for authenticating a remote entity machine, performed on an authentication server side.

Reference is now made to the flowchart of FIG. 5A presenting selected actions of a method 500A for authenticating a remote at least one entity machine (the suspect machine).

It is noted that the set of activities for authenticating the suspect machine, as described in current embodiment, is a set of activities performed on an authentication server.

It is further noted that measuring the execution time of the challenge may serve as an indication for the suspect machine of being a virtual machine, if execution time exceeds clearly the expected execution time.

The method 500A for performing remote authentication of at least one entity machine may include the steps of: generating at least one authentication challenge function, operable for execution on the suspect machine—step 510A; computing an expected challenge result—step 520A for comparison with the run time result received from the suspect machine, wherein the referenced expected challenge result may be generated on an identical machine to the suspect machine; sending the authentication challenge—step 530A to the suspect machine, for execution; starting timer on the authentication server side—step 540A, for measuring the challenge execution time on the suspect machine; receiving the challenge result—step 550A, from suspect machine; followed by stopping the timer and recording the challenge execution time—step 560A; thereafter, performing comparison of the received challenge result and the expected challenge result—step 570A; and checking if the comparison is meeting the comparison criteria—step 580A; thereafter, accepting the authentication, if said comparison criteria meets expected criteria—step 590A, otherwise, if said comparison fails the expected criteria, the authentication may be being rejected—step 595A.

Figure 5B:
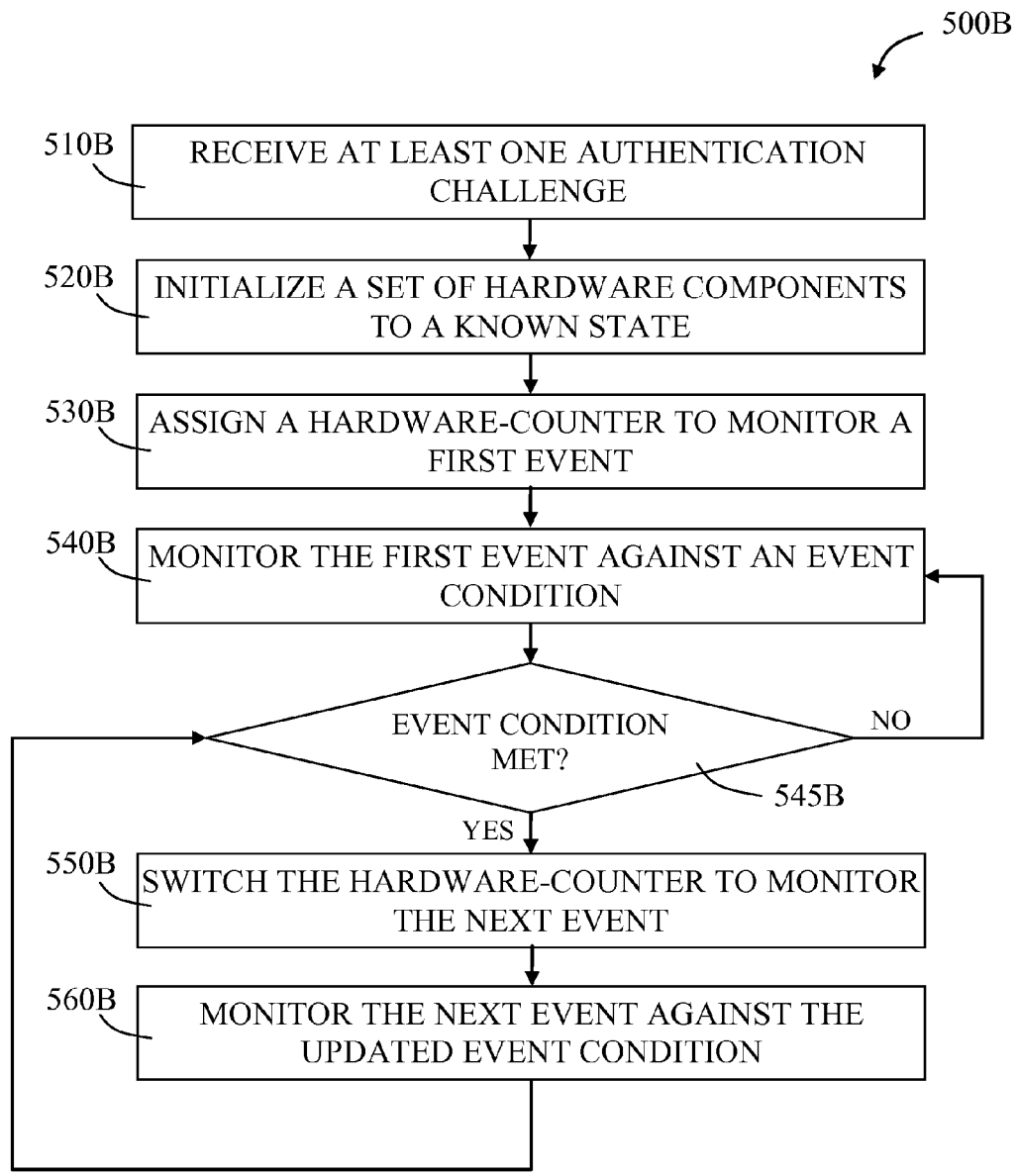
FIG. 5B is a flowchart representing selected actions of a method for executing authentication challenge on a suspect machine.

Reference is now made to the flowchart of FIG. 5B presenting selected actions of a method 500B for executing authentication challenge on a suspect machine.

It is particularly noted that the execution of the challenge on the suspect machine includes monitoring a set of at least two events. Such monitoring of events may use hardware counters for counting related information.

It is further noted that the flow chart of FIG. 5B shows, by way of illustration only, monitoring of at least two events. Accordingly, additional events may further be performed as may be configured by the authentication challenge.

It may also be noted that the set of events may be monitored sequentially on a single hardware-counter, or may be monitored in parallel on multiple hardware-counters depending on configuration of the challenge and architecture of the suspect machine.

The method 500B for executing authentication challenge on a suspect machine may include the steps of: receiving at least one authentication challenge—step 510B from an authentication server; initializing a set of hardware components to a known state—step 520B, assigning a hardware-counter to monitor a first event—step 530B; monitoring the first event against an event condition—step 530B; continuing to monitor the specified first event if the event condition is not met—step 545B; or, if the event condition is met, then switching the hardware counter to monitor the next specified event—step 550B; and monitoring the next event against an updated event condition—step 560B. The iteration is then repeated any number of times until the authentication challenge is completed and the final accrued checksum value is sent to the authentication server.

It is noted that each event condition may be a numeric threshold value or some other pre-configured condition such as when multiple hardware counters align according a rule as described herein to achieve a random sequence of hardware counter switching.

Figure 6:
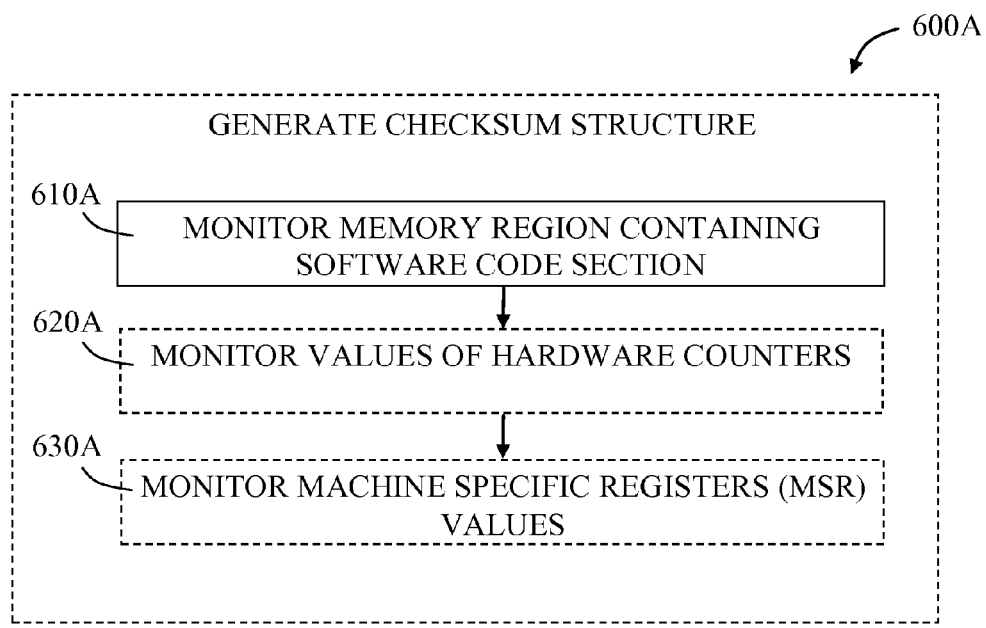
FIG. 6 is a flowchart representing selected actions of a method for generating checksum utilizing memory regions, hardware counters readings and machine specific registers, performed on suspect machine side.

Reference is now made to the flowchart of FIG. 6 presenting selected actions of a method 600A for generating a checksum structure, utilizing various memory regions, additional hardware counters readings and machine specific registers, executed on the suspect machine.

The method 600A for generating the checksum structure may include the steps of: monitoring the memory region utilizing the software code section—step 610A; monitoring values of hardware counters—step 620B; and monitoring a machine specific register (MSR) values—step 630B.

It is noted that steps 610A and steps 620A may form the basis of the checksum function, validating that the result is computed on a real machine, rather than a virtual machine (VM), and that the challenge software is authentic. Thus, it is particularly noted that the step of 630A of incorporating the machine specific registers (MSRs) values into the challenge checksum value, is a particular feature of the current disclosure. Further, the index of the machine specific register (MSR), to be incorporated into the checksum value may be derived from the value of the checksum so far, preventing the potential hacker from substituting the instruction that reads the MSR with a constant.

Accordingly, determining the appropriate portion of memory region where the software program is loaded in its entirety may be required, thereafter computing the checksum of that memory space, may provide a functionality test that the desired software program running on the suspect machine is valid and authentic.

It may further be noted that the set of challenge hardware counters incorporated into the challenge checksum may change upon every authentication request.

Checksums may be used to ensure integrity of data portions and proper functioning verification of data transmission, storage and the like. A checksum is basically a calculated summary of such data portion and may be used in various implementations as a mechanism of validity of information, such as stream channeled information, a downloadable file like JPG image file, MP3 music file or any file containing information, memory regions and the like.

The checksum mechanism may run the information content through a hash function (such as MD5 for files, CRC32, SHA-1 and others).

It is noted that the execution of the authentication challenge with the additional functionality of hardware-counting and check-summing, may be incorporated and executed within the genuinity based scheme (as described hereinabove).

It may further be noted that the authentication challenge upon execution on the suspect machine, may generate and structure a challenge result, for comparing with the expected challenge result.

Additionally, the analysis and comparison of the authentication result and the expected authentication result may be performed on the authentication server side.

It is noted that the flowchart of FIG. 6. may represent a single iteration of calculating the challenge result with various parameters, and may be configured to be performed in a loop, possibly with different values for each iteration.

It is further noted that the checksum computation may be performed in a non-additive manner, at specific points during the execution flow of the challenge function.

Where appropriate a cryptographically-secure hash function may be used to compute the checksum to prevent changing the instructions to produce a correct checksum.

It may be noted that the value of the EFER register may affect the checksum challenge computed by the challenge function. Further, a hypervisor may be identified by the bit settings of the Extended Feature Enable Register (EFER) of the CPU machine specific registers (MSR). Accordingly, upon receiving the challenge result, the authentication server may not authenticate the hypervisor because the incorrect bit setting of the EFER register produces an incorrect challenge result.

Additionally or alternatively, a hypervisor, when intercepting access of other program, may try to hide its presence by changing the bit setting of the EFER register. Such activity of a hypervisor may require the CPU to load at least a portion of the code of the hypervisor into the cache, changing hardware counters such as Instruction TLB miss count, affecting the challenge result computed during challenge execution on the suspect machine. Analyzing the challenge result, on the server side, may indicate the presence of a hypervisor by detecting incorrect value of the challenge result.

Figure 7:
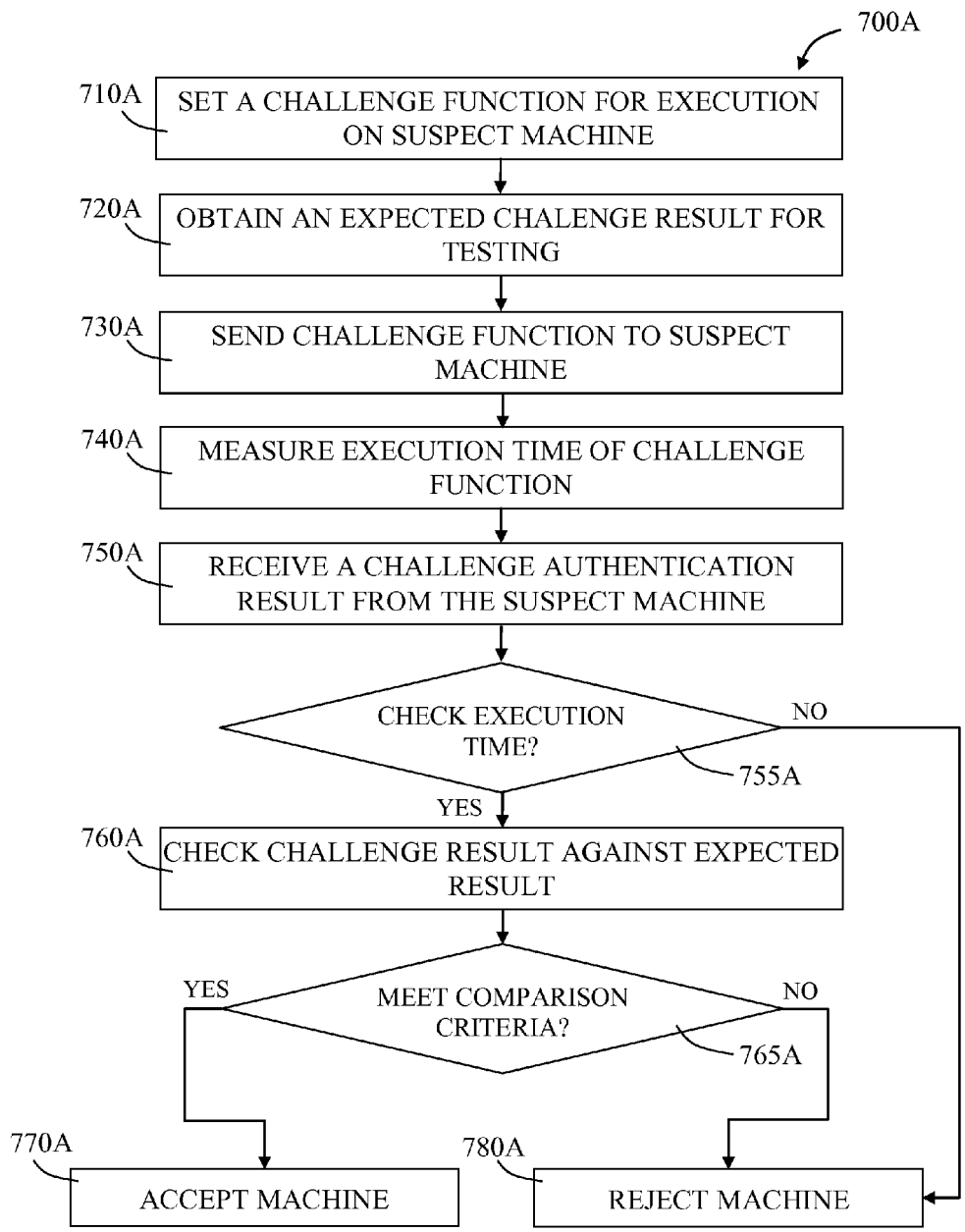
FIG. 7 is a flowchart representing selected actions of a method for analyzing suspect machine data performed on authentication server side, for determining acceptance or rejection of suspect machine.

Reference is now made to the flowchart of FIG. 7A presenting selected actions of a method 700A for analyzing suspect machine data on the authentication server side, to determine acceptance or rejection of the suspect machine.

The execution of the challenge on the suspect machine is aimed at computing a challenge checksum result based on its architecture and configuration. Returning the challenge result to the authentication server, in addition to measuring challenge execution time, allows for further analysis and decision of acceptance or rejection to be performed.

Virtual machine (VM) detection, within the context of current disclosure is essential for providing a safe authentication process to guarantee confidentiality and privacy.

It is noted that the security of virtual machines may be vulnerable to hacker attacks in various aspects, such as a hacker taking over a VM using thereafter the VM to attack other VMs, for example.

Identification of a suspect machine to be a VM may use the execution of an authentication challenge monitoring at least two hardware counters to provide a result for comparison with an expected result. Additionally, lengthy execution time may indicate the suspect machine as a VM due to the need of simulating hardware requests, requiring longer execution time compared to a "real machine" execution time.

Hypervisor detection is based on similar principles as the VM detection utilizing different hardware components, while executed on the suspect machine side as described hereinabove in FIG. 6. By incorporating values of some MSRs into the checksum at some points during the execution of the checksum calculation, the checksum will be altered by the presence of the hypervisor which is therefore discovered. Analyzing the challenge result on the server side involves comparing the validity of the challenge result with an expected value, allowing to accept or reject the suspect machine.

The method 700A may include the steps of: setting a challenge function for execution on suspect machine—step 710A, allowing to compute a challenge authentication result; obtaining an expected challenge result for testing—step 720A; sending challenge function to the suspect machine— step 730A, for execution; and in parallel, measuring the execution time of the challenge function—step 740A, on the suspect machine; upon completion of challenge execution on suspect machine, receiving the challenge authentication result from the suspect machine—step 750A; testing the execution time compared to a time limit—step 755A, and if execution time is within accepted limit, the verification process continues, otherwise suspect machine is being rejected—step 780A; thereafter checking the challenge authentication result against the expected result—step 760A; if comparison criteria are met and the checksum comparison values is positive—step 765A, then the machine is approved—step 770A; otherwise the machine is rejected— step 780A.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals there between. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A method for use in a system comprising an authentication server authenticating at least one entity machine, the method comprising:
   generating at least one authentication challenge;
   obtaining an expected challenge result comprising a calculated result for said at least one authentication challenge, at least one hardware count value and an execution time threshold value;
   sending said authentication challenge to said at least one entity machine;
   starting a timer;
   receiving a challenge result from said entity machine;
   stopping said timer thereby recording an execution time for said entity machine;
   rejecting said entity machine if said execution time is longer than said execution time threshold value;
   comparing said received challenge result with said expected challenge result; and
   rejecting said entity machine if said received challenge result does not match said expected challenge result;
   wherein said at least one hardware count value comprises a combined count value of at least two events monitored by performance hardware counters on said entity machine during execution of said authentication challenge.

2. The method of claim 1, wherein said a combined count of at least two events, further comprises the steps of:
   initializing a set of hardware components to a known state;
   assigning a hardware-counter to count a first event during execution of said at least one authentication challenge;
   monitoring said first event against an event condition; and
   switching said hardware-counter to monitor at least a second event, when said hardware-counter meets said event condition.

3. The method of claim 2, wherein said a combined count of at least two events, further comprises the steps of:
   updating said event condition to match switched said hardware-counter; and
   incorporating final hardware-counter readings into said challenge result.

4. The method of claim 2, further comprising:
   monitoring an $n^{th}$ event against an $n^{th}$ event condition; and
   switching said hardware-counter to monitor at least an $(n+1)^{th}$ event, when said hardware-counter meets said $n^{th}$ event condition.

5. The method of claim 4, wherein said a combined count of at least two events, further comprises the step of updating said event condition to match switched said hardware-counter.

6. The method of claim 2, wherein said event condition is configured to be a threshold value associated with a specific event.

7. The method of claim 2, wherein said event condition is configured to be a pre-determined condition associated with a specific event.

8. The method of claim 5, wherein said event condition is configured to be a threshold value associated with a specific event.

9. The method of claim 5, wherein said event condition is configured to be a pre-determined condition associated with a specific event.

10. The method of claim 1, wherein at least one of said events monitored on said entity machine is an event affected by the presence of a hypervisor such that if a hypervisor is present, said received challenge result will not match said expected challenge result and said entity machine is rejected.

11. The method of claim 1, wherein at least one of said events monitored on said entity machine comprises a machine specific register.

12. The method of claim 1, wherein said expected challenge result is generated by executing said authentication challenge on a machine identical to said entity machine.

13. A method for use in a system comprising an authentication server for authenticating a suspect machine, the method comprising:
   setting a challenge function to be executed on a suspect machine within a time limit;
   computing an expected challenge result;
   transmitting said challenge function to said suspect machine;
   measuring an execution time of said challenge function;
   receiving a challenge result from said suspect machine;
   comparing received challenge result with the expected challenge result; and accepting said suspect machine if said challenge result matches said expected challenge result and said execution time is less then said time limit;

wherein said challenge function includes monitoring at least two hardware counting events, monitored by at least one performance hardware counter of a similar machine.

14. The method of claim 10, wherein said challenge function, comprises the steps of:

initializing a set of hardware components to a known state;

using a hardware-counter to count a first event during execution of said challenge function;

monitoring said hardware counter against an event condition;

switching said hardware-counter to monitor at least a second event, when said hardware-counter meets said event condition; and updating said event condition to match switched said hardware-counter.

15. The method of claim 11, wherein said event condition is a threshold value associated with a specific event.

16. The method of claim 11, wherein said event condition is a pre-determined condition associated with a specific event.

* * * * *